(12) United States Patent
Cui et al.

(10) Patent No.: US 12,058,647 B2
(45) Date of Patent: Aug. 6, 2024

(54) CONFIGURED GRANT TRANSMISSION RULES

(71) Applicant: Apple Inc., Cupertino, CA (US)

(72) Inventors: Jie Cui, San Jose, CA (US); Weidong Yang, San Diego, CA (US); Yushu Zhang, Beijing (CN); Haitong Sun, Beijing (CN); Chunhai Yao, Beijing (CN); Hong He, San Jose, CA (US); Chunxuan Ye, San Diego, CA (US); Wei Zeng, Saratoga, CA (US); Dawei Zhang, Saratoga, CA (US); Oghenekome Oteri, San Diego, CA (US); Yang Tang, San Jose, CA (US); Fangli Xu, Beijing (CN); Haijing Hu, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,955

(22) PCT Filed: Apr. 8, 2020

(86) PCT No.: PCT/CN2020/083811
§ 371 (c)(1),
(2) Date: Sep. 20, 2021

(87) PCT Pub. No.: WO2021/203321
PCT Pub. Date: Oct. 14, 2021

(65) Prior Publication Data
US 2023/0029745 A1    Feb. 2, 2023

(51) Int. Cl.
*H04W 72/02* (2009.01)
*H04L 5/00* (2006.01)
(Continued)

(52) U.S. Cl.
CPC ............. *H04W 72/02* (2013.01); *H04L 5/001* (2013.01); *H04W 72/0453* (2013.01);
(Continued)

(58) Field of Classification Search
CPC . H04W 72/02; H04W 72/0453; H04W 72/56; H04L 5/001
See application file for complete search history.

(56) References Cited

U.S. PATENT DOCUMENTS

| | | | |
|---|---|---|---|
| 10,616,920 B1 | 4/2020 | Mukherjee | |
| 2020/0053799 A1 | 2/2020 | Jeon et al. | |

(Continued)

FOREIGN PATENT DOCUMENTS

| | | | |
|---|---|---|---|
| CN | 110830195 | 2/2020 | |
| WO | 2019160660 | 8/2019 | |
| WO | WO-2021121590 A1 * | 6/2021 | ........... B60G 17/017 |

OTHER PUBLICATIONS

PCT Search Report dated Dec. 16, 2020 in connection with PCT Application No. PCT/CN2020/083811.

(Continued)

*Primary Examiner* — Kevin C. Harper
(74) *Attorney, Agent, or Firm* — Eschweiler & Potashnik, LLC

(57) ABSTRACT

A network device (e.g., a user equipment (UE), a new radio NB (gNB), or other network component) can process or generate a configured grant transmission based on a logical channel. A selection of at least one of: an uplink (UL) or a supplementary UL (SUL) can be configured to be utilized for a CG transmission on an uplink channel based on the selected CG and a consistency test for determining interfering or colliding transmission with the CG transmission.

20 Claims, 13 Drawing Sheets

(51) Int. Cl.
  *H04W 72/0453* (2023.01)
  *H04W 72/56* (2023.01)
  *H04W 72/23* (2023.01)
  *H04W 72/54* (2023.01)

(52) U.S. Cl.
  CPC ............ *H04W 72/56* (2023.01); *H04W 72/23* (2023.01); *H04W 72/54* (2023.01)

(56) References Cited

U.S. PATENT DOCUMENTS

2020/0305186 A1* 9/2020 Alfarhan ............... H04W 80/08
2021/0378046 A1* 12/2021 Shimoda ............... H04W 72/27
2022/0159513 A1* 5/2022 Jung ................. H04W 28/0967

OTHER PUBLICATIONS

PCT Written Opinion dated Dec. 16, 2020 in connection with PCT Application No. PCT/CN2020/083811.
3GPP 3rd Generation Partnership Project; "Technical Specification Group Radio Access Network"; NR and NG-RAN; (Release 16) 3GPP TS 38.300 V16. 1.0; Mar. 31, 2020.
Ericsson "Summary on [AT109e][033][IIOT] Scheduling Enhancements"; 3GPP TSG-RAN WG2 #109-e; R2-200xxxx; Mar. 6, 2020.
3rd Generation Partnership Project; Technical Specification Group Radio Access Network; NR; Medium Access Control (MAC) protocol specification (Release 15) 3GPP TS 38.321 V15.8.0 (Dec. 2019): http://www.3gpp.org.
3rd Generation Partnership Project; Technical Specification Group Radio Access Network; NR; Physical layer procedures for data (Release 15): 3GPP TS 38.214 V15.9.0 (Mar. 2020); http://www.3gpp.org.
3rd Generation Partnership Project; Technical Specification Group Radio Access Network; NR; Physical channels and modulation (Release 16); 3GPP TS 38.211 V16.1.0 (Mar. 2020); http://www.3gpp.org.
3rd Generation Partnership Project; Technical Specification Group Radio Access Network; NR; Requirements for support of radio resource management (Release 16); 3GPP TS 38.133 V16.2.0 (Dec. 2019); http://www.3gpp.org.
3rd Generation Partnership Project; Technical Specification Group Radio Access Network; NR; Physical layer procedures for control (Release 15); 3GPP TS 38.213 V15.9.0 (Mar. 2020); http://www.3gpp.org.
3rd Generation Partnership Project; Technical Specification Group Radio Access Network; NR; User Equipment (UE) radio transmission an3GPP TS 38.101-1 V16.2.0 (Dec. 2019)d reception; Part 1: Range 1 Standalone (Release 16); http://www.3gpp.org.

* cited by examiner

```
LogicalChannelConfig ::= SEQUENCE {
  ul-SpecificParameters SEQUENCE {
    priority INTEGER (1..16),
    prioritisedBitRate ENUMERATED {kBps0, kBps8, kBps16, kBps32, kBps64, kBps128, kBps256, kBps512,
      kBps1024, kBps2048, kBps4096, kBps8192, kBps16384, kBps32768, kBps65536, infinity},
    bucketSizeDuration ENUMERATED {ms5, ms10, ms20, ms50, ms100, ms150, ms300, ms500, ms1000,
      spare7, spare6, spare5, spare4, spare3, spare2, spare1},
    allowedServingCells SEQUENCE (SIZE (1..maxNrofServingCells-1)) OF ServCellIndex
      OPTIONAL, -- PDCP-CADuplication
    allowedSCS-List SEQUENCE (SIZE (1..maxSCSs)) OF SubcarrierSpacing OPTIONAL, -- Need R
    maxPUSCH-Duration ENUMERATED {ms0p02, ms0p04, ms0p0625, ms0p125, ms0p25, ms0p5, spare2, spare1}
      OPTIONAL, -- Need R
    configuredGrantType1Allowed ENUMERATED {true} OPTIONAL, -- Need R
    logicalChannelGroup INTEGER (0..maxLCG-ID) OPTIONAL, -- Need R
    schedulingRequestId SchedulingRequestId OPTIONAL, -- Need R
    logicalChannelSR-Mask BOOLEAN,
    logicalChannelSR-DelayTimerApplied BOOLEAN,
    SUL_or_UL_
  },
  bitRateQueryProhibitTimer ENUMERATED {s0, s0dot4, s0dot8, s1dot6, s3, s6, s12, s30} OPTIONAL -- Need R
} OPTIONAL, -- Cond UL
...
```

*FIG. 5*

| Channel | High | Low | Comment |
|---|---|---|---|
| DG PUSCH | x | x | PHY layer indication/signaling |
| CG PUSCH | x | x | explicit indication (RRC parameter) for Type 1 and Type 2 CG PUSCH |
| SR | x | x | High/Low for two different service types known at PHY layer |
| PUCCH-BFR | x | x | Same as an SR resource |
| HARQ-ACK | x | x | for dynamically scheduled PDSCH and SPS PDSCH |
| SP-CSI on PUSCH | x | x | Depends on 2-level priority of PUSCH carrying it |
| A-CSI | x | x | Depends on 2-level priority of PUSCH carrying it |
| P/SP-CSI | | x | |
| P/SP-SRS /A-SRS | | x | Triggered by DCI-Format 2_3 |
| P/SP-SRS /A-SRS | FFS | FFS | Triggered by other DCI-Formats |
| PRACH | | | Per UE implementation to handle collision |

*FIG. 6*

CONFIGURED GRANT TRANSMISSION RULES

REFERENCE TO RELATED APPLICATIONS

This application is a National Phase entry application of International Patent Application No. PCT/CN2020/083811 Apr. 8, 2020, entitled "CONFIGURED GRANT TRANSMISSION RULES", the contents of which are herein incorporated by reference in their entirety.

FIELD

The present disclosure relates to wireless technology and more specifically to rules for configured grants.

BACKGROUND

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

FIG. 5 is an example priority chart for consistency test for CG transmissions in accordance with various aspects described.

FIG. 6 is an example of other channel or signal interference by overlapping transmissions with a CG configured shared channel in accordance with various aspects described.

DETAILED DESCRIPTION

Figure 1:
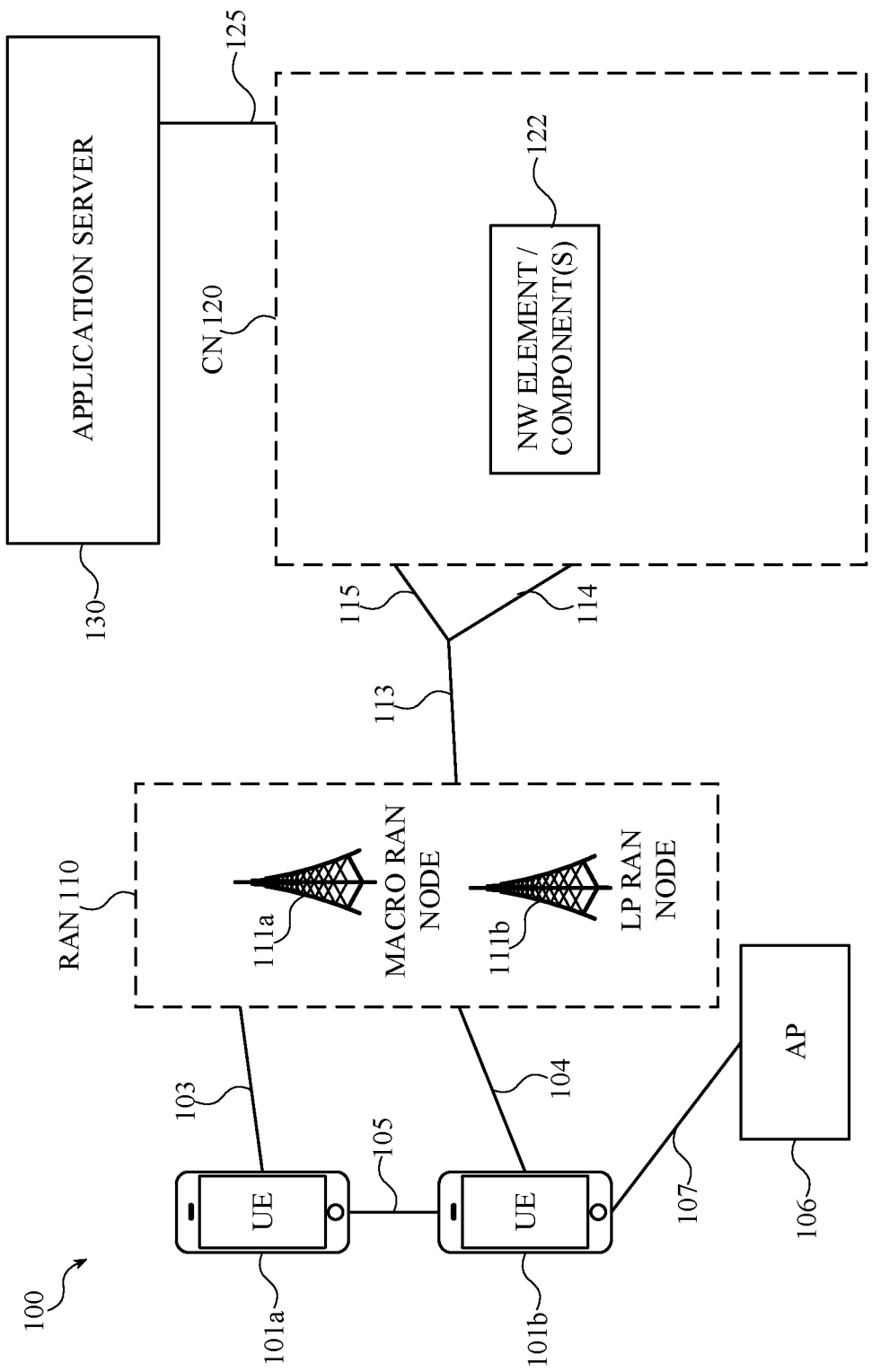
FIG. 1 is an example block diagram illustrating an example of user equipment(s) (UEs) and next generation NodeBs (gNBs) or access nodes in a network with network components useable in connection with various aspects described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein can be implemented into a system or network device using any suitably configured hardware and/or software. FIG. 1 illustrates an architecture of a system 100 of a network in accordance with some embodiments. The system 100 is illustrated to include a UE 101a and UE 101b, which can further represent new radio (NR) devices (e.g., a UE or gNB) or the like as discussed herein.

FIG. 1 illustrates an example architecture of a system 100 of a network, in accordance with various embodiments. The following description is provided for an example system 100 that operates in conjunction with the LTE system standards and 5G or NR system standards as provided by 2GPP technical specifications. However, the example embodiments are not limited in this regard and the described embodiments can apply to other networks that benefit from the principles described herein, such as future 2GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be a next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface or layer (discussed in further detail below).

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 2GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101*b* in radio resource control RRC_CONNECTED being configured by a RAN node 111*a*-*b* to utilize radio resources of LTE and WLAN. LWIP operation can involve the UE 101*b* using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (ANs) or RAN nodes 111*a* and 111*b* (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally, or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

In V2X scenarios one or more of the RAN nodes 111 can be or act as RSUs. The term "Road Side Unit" or "RSU" can refer to any transportation infrastructure entity used for V2X communications. An RSU can be implemented in or by a suitable RAN node or a stationary (or relatively stationary) UE, where an RSU implemented in or by a UE can be referred to as a "UE-type RSU," an RSU implemented in or by an eNB can be referred to as an "eNB-type RSU," an RSU implemented in or by a gNB can be referred to as a "gNB-type RSU," and the like. In one example, an RSU is a computing device coupled with radio frequency circuitry located on a roadside that provides connectivity support to passing vehicle UEs 101 (vUEs 101). The RSU can also include internal data storage circuitry to store intersection map geometry, traffic statistics, media, as well as applications/software to sense and control ongoing vehicular and pedestrian traffic. The RSU can operate on the 5.9 GHz DSRC band to provide very low latency communications required for high speed events, such as crash avoidance, traffic warnings, and the like. Additionally, or alternatively, the RSU can operate on the cellular V2X band to provide the aforementioned low latency communications, as well as other cellular communications services. Additionally, or alternatively, the RSU can operate as a Wi-Fi hotspot (2.4 GHz band) and/or provide connectivity to one or more cellular networks to provide uplink and downlink communications. The computing device(s) and some or all of the radiofrequency circuitry of the RSU can be packaged in a weatherproof enclosure suitable for outdoor installation, and can include a network interface controller to provide a wired connection (e.g., Ethernet) to a traffic signal controller and/or a backhaul network.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (μs); however, the size of the CWS and a maximum channel occupancy time (MCOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). A CC can have a bandwidth of 1.4, 2, 5, 10, 15 or 20 MHz and a maximum of about five CCs or otherwise can be aggregated, and therefore, a maximum aggregated bandwidth can be about100 MHz, for example. In frequency division duplex (FDD) systems, the number of aggregated carriers can be different for DL and UL, where the number of UL CCs is equal to or lower than the number of DL component carriers. In some cases, individual CCs can have a different bandwidth than other CCs. In time division duplex (TDD) systems, the number of CCs as well as the bandwidths of each CC is usually the same for DL and UL.

CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to above, each ECCE can correspond to nine sets of four physical resource elements known as EREGs. An ECCE can have other numbers of EREGs in some situations.

The RAN nodes 111 can be configured to communicate with one another via interface 112. In embodiments where the system 100 is an LTE system, the interface 112 can be an X2 interface 112. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 100 is a 5G or NR system, the interface 112 can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC (referred to as "5GC 120" or the like), and the RAN 110 can be connected with the CN 120 via an NG interface 112. In embodiments, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an EPC). Where CN 120 is an EPC (referred to as "EPC 120" or the like), the RAN 110 can be connected with the CN 120 via an S1 interface 112. In embodiments, the S1 interface 112 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
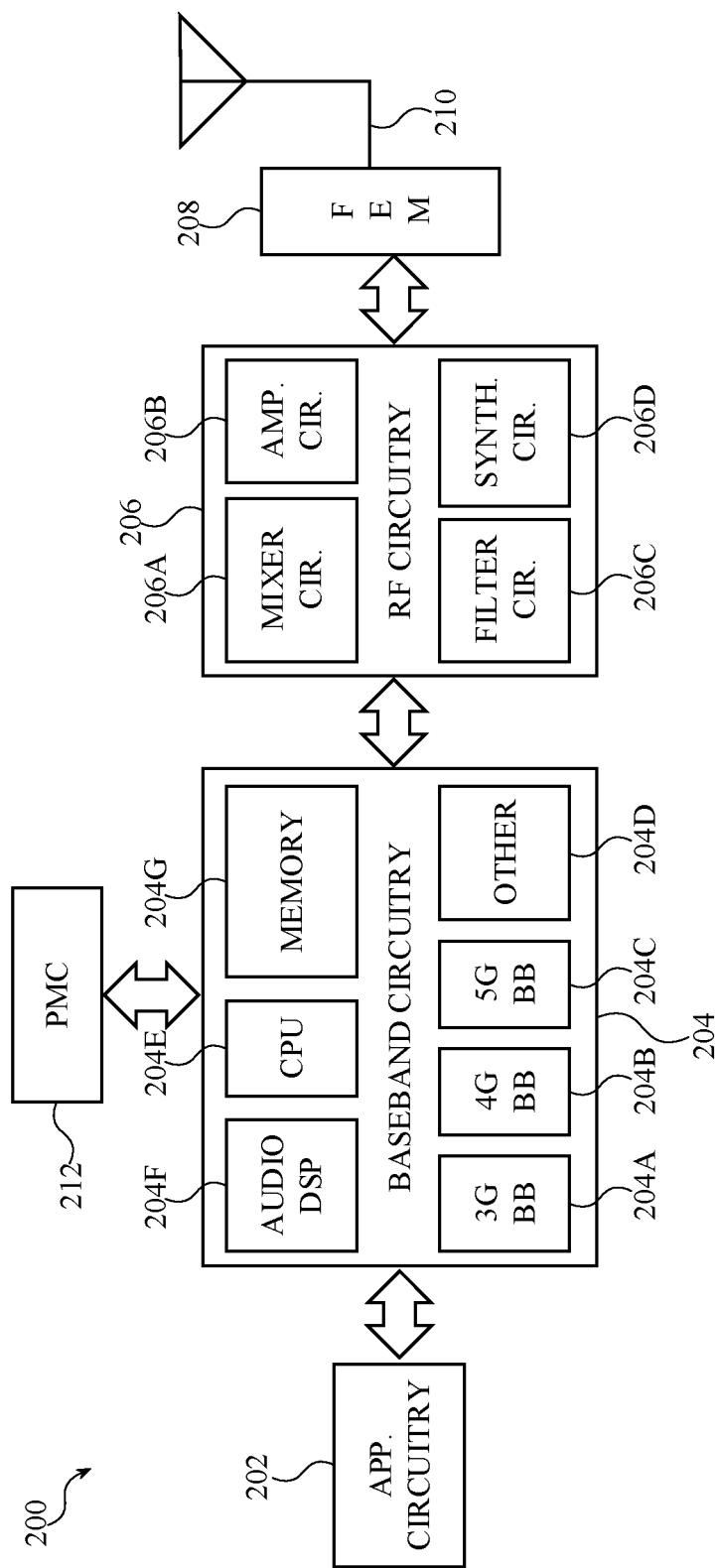
FIG. 2 is another example block diagram illustrating a system employable at a UE or gNB, according to various aspects described herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low-Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 shows the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
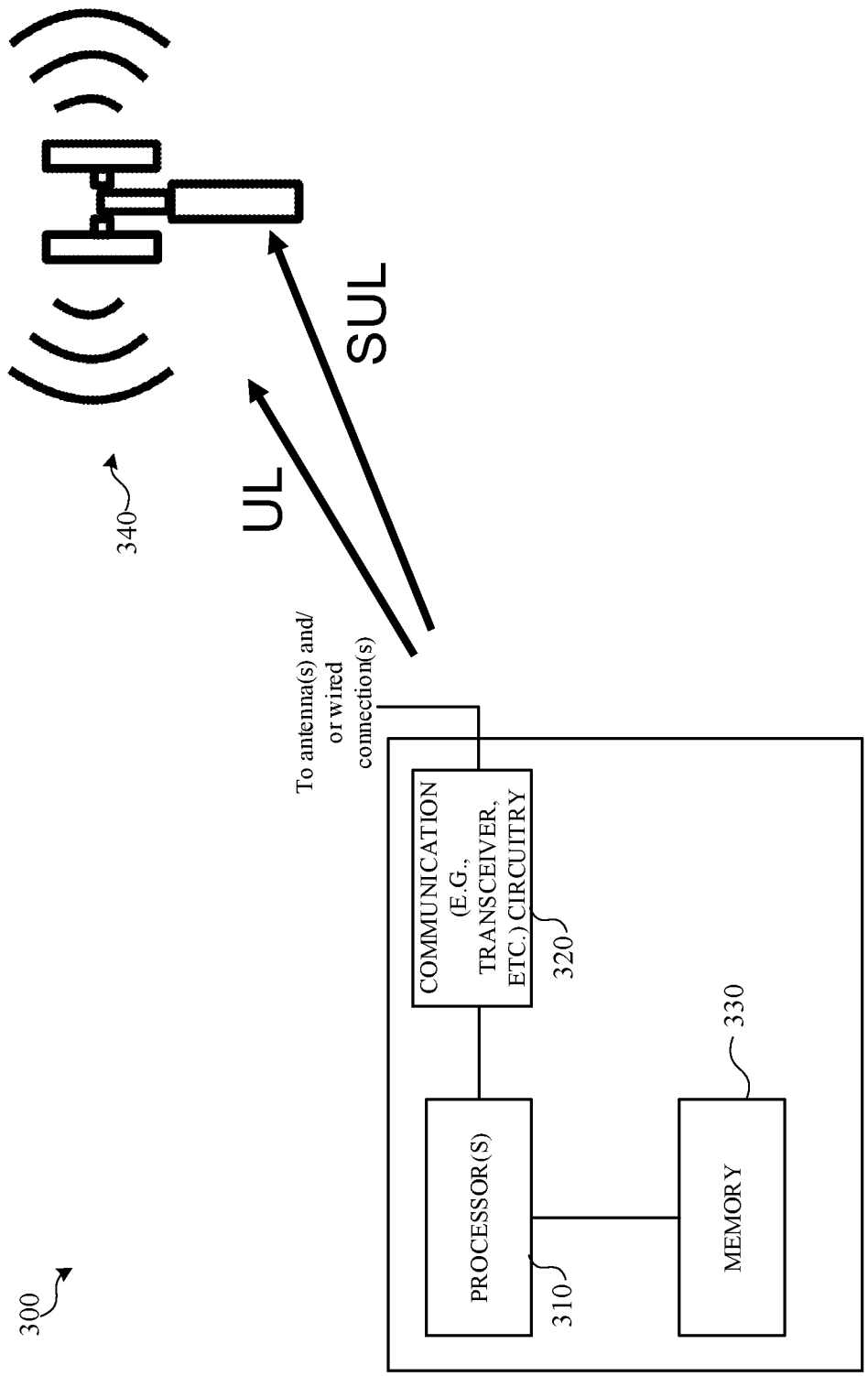
FIG. 3 is an exemplary simplified block diagram of a UE wireless communication device or other network device/component (e.g., gNB) in accordance with various aspects described.

Referring to FIG. 3, illustrated is a block diagram of a user equipment wireless communication device (UE) or other network device/component (e.g., gNB, eNB, or other participating entity). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

In various embodiments (aspects) discussed herein, signals or messages can be generated and output for transmission, and/or transmitted messages can be received and processed. Depending on the type of signal or message generated, outputting for transmission (e.g., by processor(s) 310, processor(s) 310, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 310) can comprise one or more of: identifying physical resources associated with the signal/message, detecting the signal/message, resource element group de-interleaving, demodulation, descrambling, and/or decoding.

A single configured grant (CG) can be configured at a cell, either on UL or SUL (Supplementary UL). SUL can be configured on a frequency range 1 (FR1) for FR1, with time division duplexing (TDD) spectrum for both DL and UL (at 3.5 GHz) higher than FDD spectrum 1.8 GHz, where for uplink, two carriers are configured: one in TDD spectrum (3.5 GHz), another (SUL) at 1.8 GHz. Type 1 is RRC configured, and whereas CG Type 2 can be activated by DCI, in which one or more parameters can be RRC configured.

UL at FR1 has a TDD spectrum for both DL and UL so it tends to be at a higher frequency (e.g., about 3.5 GHz). The footprint of the cell is much smaller than FDD spectrum at 1.8 GHz, so for uplink, for example, two carriers are configured: one in TDD spectrum (about 3.5 GHz), another (SUL) at 1.8 GHz. With SUL since the carrier frequency is lower so the path loss is smaller, and the coverage is larger. Thus, a same footprint can be retained as with FDD. Additionally, usually cell coverage in UL direction is lower than DL direction because UE Tx Power (UL Power) is not as strong as gNB Tx Power (DL Power). The performance degradation on UL direction due to this difference can be serious as the UE 101, 200, or 300 approaches a cell edge. As a possible solution, an idea to use very low frequency than the original UL frequency. Cell coverage gets larger as frequency gets lower. This is the motivation behind SUL to use a secondary UL at much lower frequency). When the channel condition is good, the network can indicate to the UE to use the original UL frequency and when channel condition gets poor than a certain criteria, the network can direct the UE to use the secondary (supplementary) UL frequency. There are several NR bands dedicated for SUL (e.g., n80, n81, n82, n83, n84, n86, or the like). These can be under 2 GHz, which can be lower than commonly used NR frequency (e.g., over 3 GHz). However, one possible drawback of this approach is that these SUL bands can collide with existing LTE bands. As such, this could cause NR-LTE co-existence issues.

In Rel 16, up to twelve configured grants can be configured and active up at a bandwidth part (BWP), where some of them may be configured at UL, some of them may be configured at SUL. However, the rules to choose a configuration grant among all the configurations are not specified, and further, the UE's selection may not be aligned with the network's preference. Hence, CG rules are desired so that the UE behavior can be regulated and be aligned with the network's preference. CG transmission is one of the rare occasions where a UE is configured with some autonomy in its behavior. As such, embodiments herein configure a UE's behavior to be more predictable at the gNB 111, 200, 300 or 340 side, and hence it is more likely for the gNB 111, 200, 300 or 340 to enable the configured grant feature. A configured grant as an information element in a logical channel can be utilized as configuredGrantConfig for a CG of a type 1 or type 2, which may be configure for UL or SUL, but in case of type 1 not for both at a time necessarily. Except for reconfiguration with sync, the network does not reconfigure configuredGrantConfig when there is an active configured UL grant Type 2 (see TS 38.321 [3]). However, the network may release the configuredGrantConfig at any time. The configuration element rrc-ConfiguredUplinkGrant can be a configuration for a "configured grant" transmission with fully RRC-configured UL grant (Type 1). If this field is absent the UE uses UL grant configured by DCI addressed to CS-RNTI (Type 2). Type 1 configured grant may be configured for UL or SUL, but not necessarily for both at the same time, simultaneously.

Figure 4:
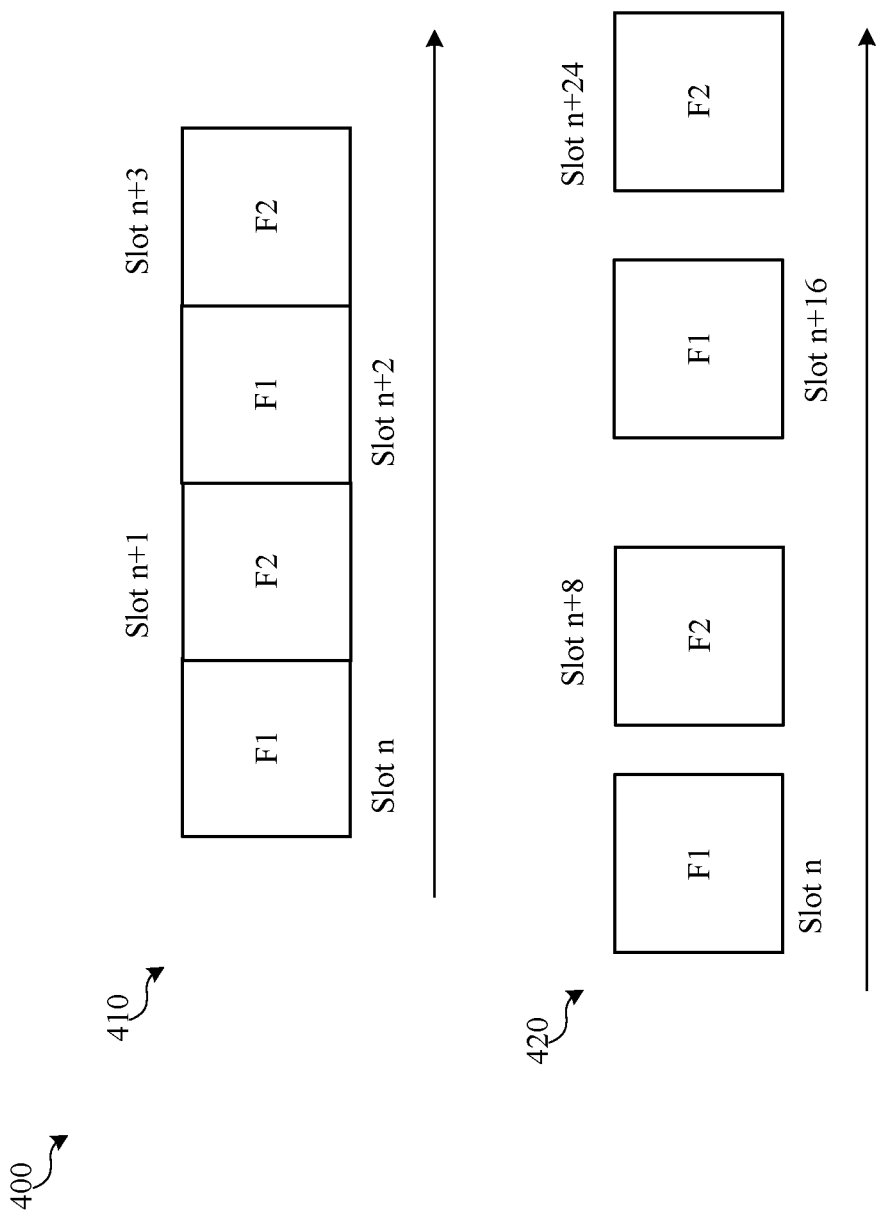
FIG. 4 is an exemplary simplified block diagram of different slot configurations for CG transmissions in accordance with various aspects described.

FIG. 4 illustrates an example of different slots of transmission configurations 400 for CG configuration in SUL and UL according to various embodiments. Type 1 is RRC configured and Type 2 is activated by DCI, in which many parameters are RRC configured.

In one case the gNB 111, 200, 300 or 340 can configure type 1 CG, where the UE can be configured with a configured grant (e.g., Type 1 configured grant, denoted as CG-x) with transmissions on slot n+1, n+3, n+5, . . . etc., on SUL (at frequency F1). A UE 101, 200 or 300 can be configured with a configured grant (e.g., Type 1 configured grant, denoted as CG-y) with transmissions on slot n+2, n+4, n+6, . . . etc., on UL (at frequency F2).

In the top example transmission configuration, the PUSCHs from slot n to slot n+3 are shown as back-to-back, which can be challenging for UE implementation, as the UE may need to switch from F1 to F2 (e.g. from slot n to Slot n+1), and such configurations may be treated as an error case from a specification point of view. This can also involve what is to be referred to as a switching time, which is discussed infra, as a time to switch from UL to SUL or vice versa for CG transmissions. On the right figure, as there should be enough time for the UE 101, 200 or 300 to switch from F1 to F2 and vice versa, such configurations can be supported by the UE 101, 200 or 300.

Various embodiments herein provide conditions for configuring UL, SUL, or both UL and SUL for CG and under what conditions. Further, some restrictions are indicated by the gNB 111 or UE 101 if the UE transmits on F1 at time T, but it is required to transmit (e.g., physical uplink control channel (PUCCH)/physical random access channel (PRACH)/the physical uplink shared channel (PUSCH)/ sounding reference signal (SRS)) over F2 at time T+ΔT. Phrased in another way: when a UE 101 selects UL or SUL for CG transmission, it can cause interruption for other channels/signals such as PUCCH, SRS or PRACH. As the UE 101 has further autonomy to choose transmission over CG in Rel-15 and Rel-16, and in Rel-16, choose a particular CG for transmission, which may interfere ongoing transmission or expected transmission, e.g. disrupting HARQ-feedback for DL, the condition for CG transmission these considerations of conditions and restrictions as a set of CG rules can be further embodied into UE/gNB configurations.

FIG. 5 illustrates an example information element 500 in accord with various embodiments. For example, directly related to the physical restriction can be a restriction according to a logical channel. Because the SUL is typically at a lower frequency and UL is at a higher frequency, the higher frequency at a larger bandwidth can be easier to come by. The lower frequency typically since the path loss is less is also more robust. As such, a logical channel could be configured by the gNB 111, network or at the UE 101 to carry an indication such as by information element (IE) 500 over SUL rather than UL. For example, from a latency point of view, a logical channel configuration can introduce an IE 500 to signal whether SUL, UL, or both are allowed to be selected and utilized as part of embodiments/aspects herein. An IE can be used to signify whether SUL or UL is allowed for a logical channel or not. Assume SUL and UL typically have different subcarrier spacings as in FIG. 4; this may be supported through "allowedSCS-List" in the configuration of the IE 500, for example.

As mentioned above, CG transmission is one of the rare occasions that the UE makes decision in transmission by itself. As most of the transmission in an NR network is controlled by the network, the autonomy by the UE 101, 200, or 300 can be configured to ensure that it does not interfere/inhibit/disrupt/collide with other transmissions expected at the gNB 111, 200, 300, or 340.

Referring to FIG. 6, illustrated is an example priority chart 600 than can be utilized with various embodiments. When the UE transmits over CG, it may lead to the inhibition of other channels/signals' transmission. In a first example, PUSCH transmission over CG could overlap with a dynamic PUSCH transmission. In a second example, PUSCH transmission over CG could overlap with a PUCCH carrying HARQ-ACK in response to a DL PDSCH transmission. In a third example, PUSCH transmission over CG could overlap with a periodic/semi-persistent PUCCH transmission for CSI reporting. In a fourth example, PUSCH transmission over CG could overlap with a semi-persistent PUSCH transmission for semi-persistent CSI reporting. In a fourth example, PUSCH transmission over CG could overlap with a SRS transmission which may be periodic, semi-persistent or aperiodic. In a fifth example, PUSCH transmission over CG could overlap with a PUCCH carrying beam failure recover request (BFRQ). Other such examples of interference with CG transmissions can also be envisioned and are not limited necessarily to these examples.

In one embodiment, the UE 101, 200, or 300 can be configured to perform a consistency test for a CG transmission. The consistency test ensures that if a selected CG resource is used for CG transmission, some signals/channels can be dropped consequently, and in that case, dropping those channels/signals in deference to the transmission over the selected CG resource is consistent with the dropping rules/priority rules defined in Rel-15/Rel-16. For the consistency test, the UE 101 can be configured to decide: when to perform consistency test with various types of information (e.g., the priority chart 600) including priorities of various network channel/signals as being low or high, and information on the types of signals/channels that may interfere as well.

For example, the UE 101 can perform the consistency test between the CG transmission and all the periodic/semi-periodic/aperiodic transmissions known by the UE at a particular symbol or set of symbols such as L2 symbols before the CG transmission, or a start of an interruption time (e.g., a time to switch carriers from UL to SUL, and/or vice versa, as well as the CG transmission time). If there is any information (e.g. DCI scheduling an uplink transmission, or otherwise) that comes too close to the CG transmission, the UE 101 is not able to cancel or modify its CG transmission based on this information.

In other embodiments, the UE 101 can be configured to consider duration, the consistency test is performed. If the CG transmission will disrupt some periodic/semi-persistent/aperiodic transmission, the interruption can include the transmission duration of the CG, for example. However, the CG transmission time may not be the only time duration to be considered. For example, depending on which carrier (SUL or UL) is used for the CG transmission, and the transmission before the CG, and the transmission after the CG, there can be zero, one or two switching times involved, where a switching time includes a time from one SUL or UL to the other.

If a CG transmission passes the consistency test, the UE 101 can enter the test CG transmission in a candidate CG transmission set, for example. The UE 101, for example, can then select a CG from among the candidate CG transmission set to utilize for transmission. The UE 101 (including 200, or 300 in this disclosure) then can conduct the CG transmission; perform cancellation of signals/channels if any with respect to the CG transmission. As such, if CG configuration within a slot passes the consistency test and then multiple CGs could be a candidate for use and it becomes up to a decision by the UE for which one or more to utilize.

Figure 7:
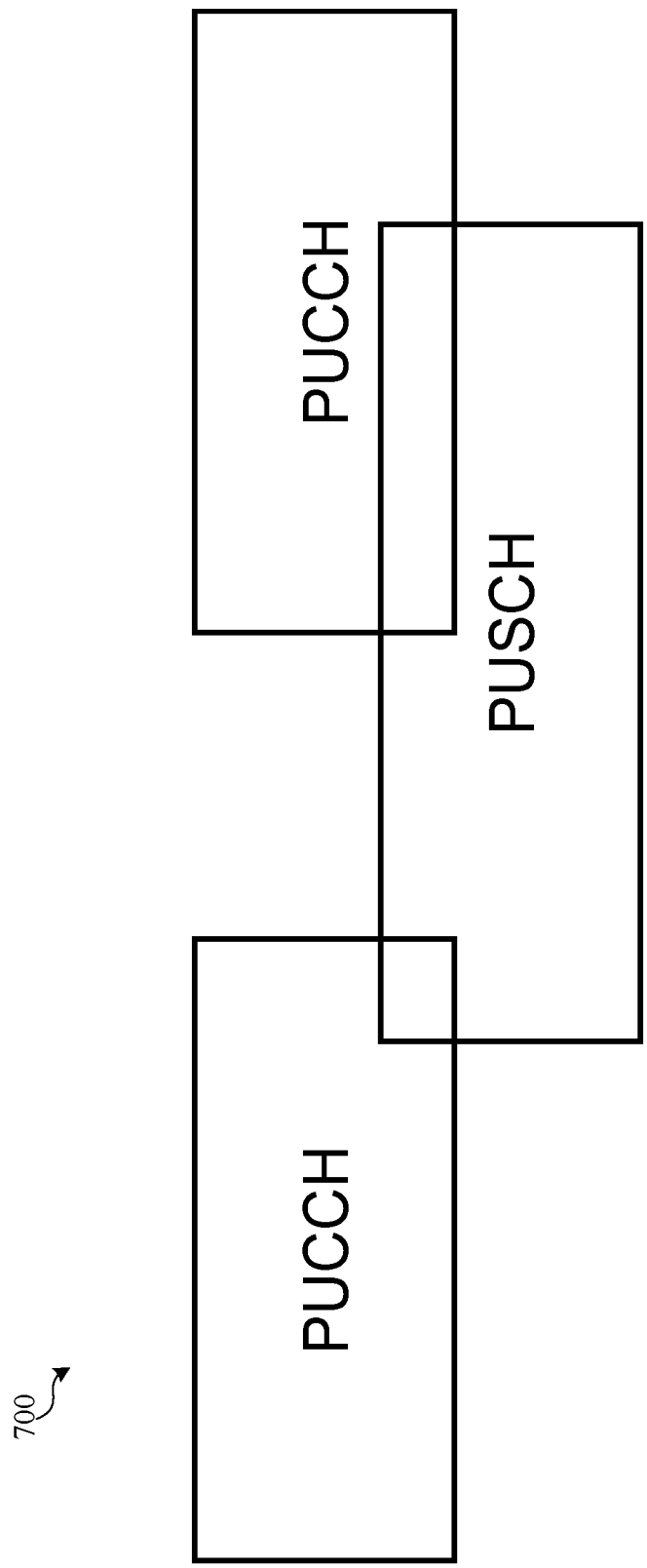
FIG. 7 is an example of available overlapping information that can be considered in a consistency test for CG transmissions in accordance with various aspects described.

FIG. 7 illustrates a simple block example of potential interfering signals 700 such as PUSCH based on CG that could interfere with PUCCH, for example. In Rel-15, dropping rules are defined to handle cases where there can be collision among signals/channels, which can be utilized via the consistency test performed by the UE 101 in configuring CG transmissions in SUL, UL or both. In Rel-16, PUCCH carrying scheduling request (SR), PUCCH carrying HARQ feedback, PUCCH carrying channel state information (CSI) and PUSCH can be associated with a priority level, as well as any signals that have derivative priority as well. The UE 101 can utilize these definitions for priority to perform the consistency test for CG transmissions in UL or SUL, for example.

For a UE 101 to perform CG transmissions, the first step then becomes to perform a consistency test. The UE 101 compares to drop any channel/signals against the CG transmission. The UE conducts a CG transmission to drop the channels that are for lower priority for the CG transmission. If for example a high priority signal or a high priority DL transmission and this CG transmission is configured for low priority, then the UE 101 shall not pursue the CG transmission because that is of a higher priority, such as, for example, HARQ feedback in the UL.

Where x is designated at both high and low priority columns of the priority table 600 a priority can be assigned to either one, as high or low. For example, PUSCH dynamic grant could be both, either configured by RRC, the gNB 111, the UE 101 or other network entity device, for example. Some contents or signals can be both, and some signals with contents or signals could always low. The priority table 600 is only an example and could be configured differently in other embodiments herein. CSI, for example, could always be low so if any collision between a high priority one versus a low like P/SP-CSI one then drop the lower priority transmission could be dropped, or factored along with other considerations made in the consistency test.

Some priorities could be determined dynamically and others predefined. CGs priority, for example, is RRC configured, DGs priority is indicated in the DCI. SR is RRC configured, as is HARQ-ACK feedback. Others can be derivate, for example, as indicated in the DCI for DL transmission where if a DL transmission is high priority then HACK-ACK feedback is a high priority. The SP CSI uses UL of DCI to activate it so the UL of DCI can have a priority field that can be indicated as such. Likewise, a priority of CSI can have an uplink in DCI so priority can be indicated as such. In other situations at a high level it is either RRC configured or DL provided, or likewise could be specified as a low priority.

Figure 8:
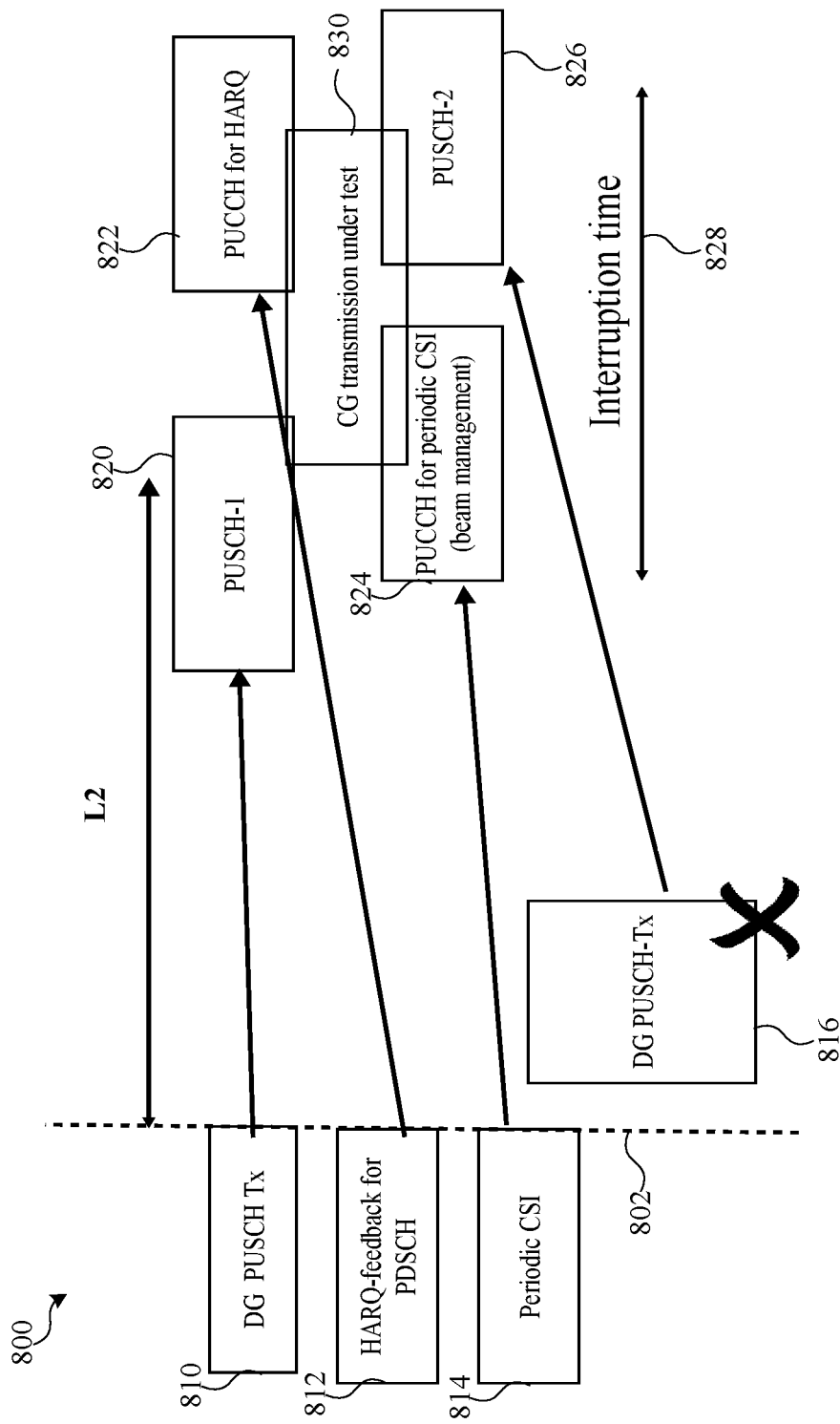
FIG. 8 is another example of available information that can be considered in a constancy test for CG transmissions in accordance with various aspects described.

FIG. 8 illustrates example considerations for the consistency test including available information in accord with embodiments herein. The UE 101 can be configured to perform a consistency test with information available before L2 symbols or $T_{proc,2}$ time of the CG transmission under test 830. In the description below, $T_{proc,2}$ time can be applied in replacement of L2 symbols wherever "L2 symbols" is used. If a DCI e.g. scheduling PUSCH-1 820 is received before that point, the gNB 111 scheduling decision is considered in the consistency test, otherwise any decision is not considered (e.g. DG PUSCH-2 826, which did not get scheduled up to or before the L2 symbols). In TS 38.214, L2 is given as included below. Notice the determination of L2 depends on the calculation of $T_{proc,2}$ which in turn has dependence on the numerologies for PDCCH carrying the PUSCH and the PUSCH. For Type 2 CG, once activated, no DCI scheduling the PUSCH is required for the initial transmission of a transport block. A few embodiments can be configured here:

Option 1: μ corresponds to the one of ($\mu_{UL}$) which is the subcarrier spacing of the uplink channel with which the CG PUSCH is to be transmitted, Option 2: μ corresponds to the one of ($\mu_{DL}, \mu_{UL}$) resulting with the largest $T_{proc,2}$, where the $\mu_{DL}$ corresponds to the smallest subcarrier spacing of all downlink component carriers with which a PDCCH carrying a DCI which can schedule a PUSCH on the same carrier where the tested CG PUSCH is carried, and $\mu_{UL}$ corresponds to the subcarrier spacing of the uplink channel with which the PUSCH is to be transmitted.

As referenced in TS 38.214: If the first uplink symbol in the PUSCH allocation for a transport block, including the DM-RS, as defined by the slot offset $K_2$ and the start and length indicator SLIV of the scheduling DCI and including the effect of the timing advance, is no earlier than at symbol $L_2$, where $L_2$ is defined as the next uplink symbol with its CP starting $T_{proc,2}=\max((N_2+d_{2,1})(2048+144)\cdot k2^{-\mu}\cdot T_c, d_{2,2})$ after the end of the reception of the last symbol of the PDCCH carrying the DCI scheduling the PUSCH, then the UE shall transmit the transport block.

$N_2$ is based on μ of Table 6.4-1 and Table 6.4-2 for UE processing capability 1 and 2 respectively, where p corresponds to the one of ($\mu_{DL}, \mu_{UL}$) resulting with the largest $T_{proc,2}$, where the $\mu_{DL}$ corresponds to the subcarrier spacing of the downlink with which the PDCCH carrying the DCI scheduling the PUSCH was transmitted and $\mu_{UL}$ corresponds to the subcarrier spacing of the uplink channel with which the PUSCH is to be transmitted, and K is defined in clause 4.1 of [4, TS 38.211].

If the first symbol of the PUSCH allocation consists of DM-RS only, then $d_{2,1}=0$, otherwise $d_{2,1}=1$.

If the UE is configured with multiple active component carriers, the first uplink symbol in the PUSCH allocation further includes the effect of timing difference between component carriers as given in [11, TS 38.133].

If the scheduling DCI triggered a switch of BWP, $d_{2,2}$ equals to the switching time as defined in [11, TS 38.133], otherwise $d_{2,2}=0$.

For a UE that supports capability 2 on a given cell, the processing time according to UE processing capability 2 is applied if the high layer parameter processingType2Enabled in PUSCH-ServingCellConfig is configured for the cell and set to enable; —If the PUSCH indicated by the DCI is overlapping with one or more PUCCH channels, then the transport block is multiplexed following the procedure in clause 9.2.5 of [6, TS 38.213], otherwise the transport block is transmitted on the PUSCH indicated by the DCI. Otherwise the UE may ignore the scheduling DCI. The value of $T_{proc,2}$ can be used both in the case of normal and extended cyclic prefix.

TABLE 6.4-1

PUSCH preparation time for PUSCH timing capability 1:

| μ | PUSCH preparation time $N_2$ [symbols] |
|---|---|
| 0 | 10 |
| 1 | 12 |
| 2 | 23 |
| 3 | 36 |

TABLE 6.4-2

PUSCH preparation time for PUSCH timing capability 2

| μ | PUSCH preparation time $N_2$ [symbols] |
|---|---|
| 0 | 5 |
| 1 | 5.5 |

The interruption time 828 is illustrated as at least the time for the CG transmission under the consistency test 830.

The L2 symbols can be for handling UE capability or a UE with a certain capability, which can be indicated as a capability 1/capability 2. Capability one is slower processing and capability 2 is faster, which can depend on the minimum time the UE 101 needs from DCI triggering to DCI scheduling to an actual UL transmission.

Any one information available before this point (e.g., up to the L2 symbol(s) transmission) could be considered by the UE in the consistency test for configuring CG transmissions PUSCH-1 820, PUCCH for HARQ 822, PUCCH for periodic CSI (beam management) 824. For example, the DG uplink transmission 810 (e.g., DG PUSCH TX), the HARQ-ACK feedback for PDSCH 812, and then the Periodic CSI 814 could be considered as well as their corresponding transmission because they are available to the UE 101 by the L2 symbol point 802. As such, if there are many slots ahead because this is a periodical configuration and it is from RRC right lots of information could be available before the L2 symbols are configured for an actual transmission. However, if some information becomes available after L2 (e.g., the DG PUSCH-Tx 816), then the UE 101 just leaves it or does not consider it because there is no way to react for it or to factor it as a later communication. In this case because the UE 101 has already prepared to send over the CG, the UE acts/ operates as if this one operates as a more onerous transmission and thus the UE 101 can drop this one irrespective based of higher/lower priority because the UE 101 does not have time.

Figure 9:
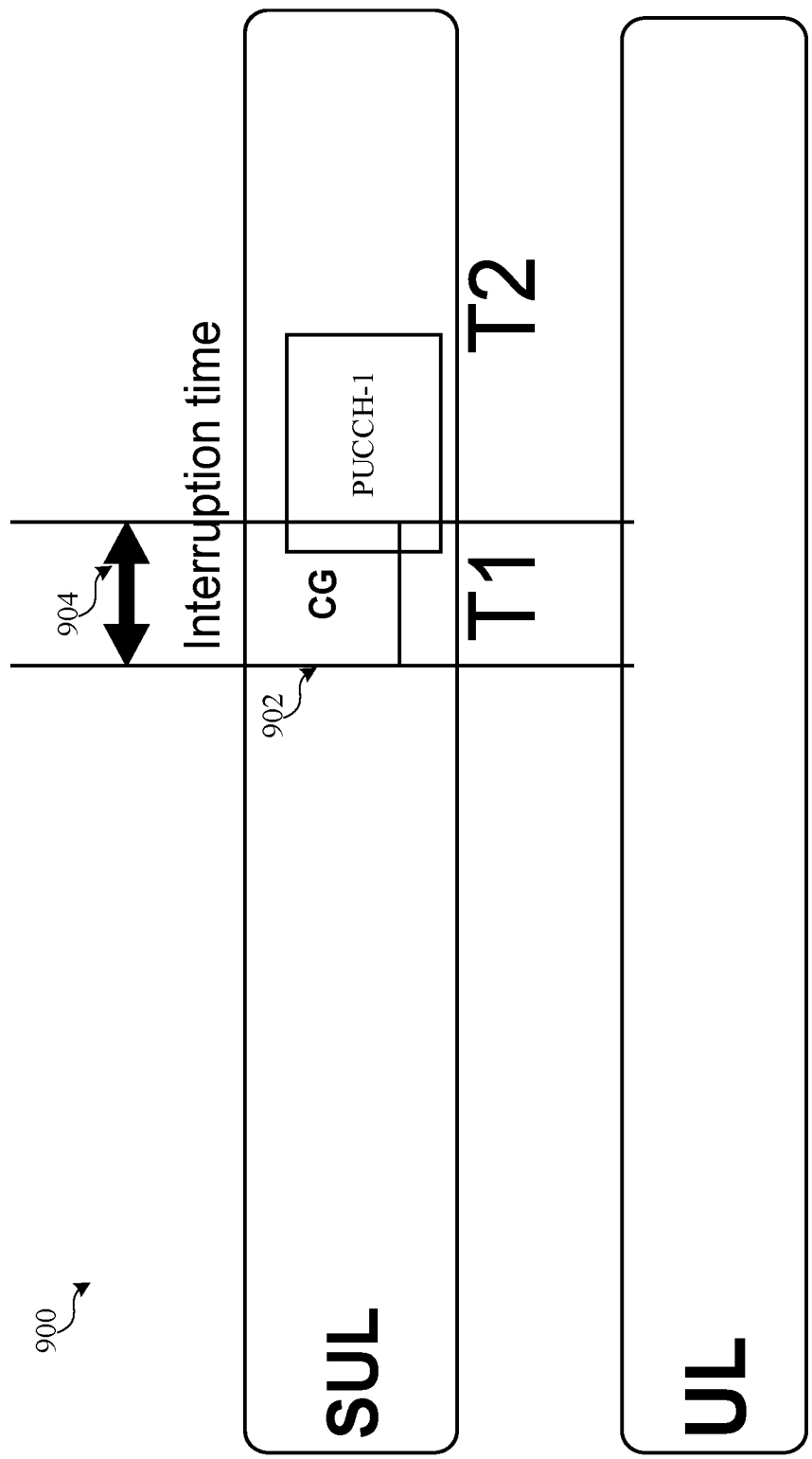
FIG. 9 is an example of interruption time that can be factored into the consistency test for CG transmissions in accordance with various aspects described.

FIG. 9 illustrates an example of interruption time 900 to be considered as a factor in the consistency test for CG transmissions in accord with embodiments herein. As with each of the embodiments herein, the UE 101 utilizes the consistency test to determine or consider a selection of or choosing at least one of: SUL or UL for configured grant PUSCH transmission. If the transmission before the tested CG transmission, the tested CG transmission itself, the transmission after the tested CG transmission are on the same carrier, then the interruption time can be just the CG transmission time as illustrated.

Considering the example of FIG. 9 there can be channels/signals (e.g., SRS) expected in the near future (e.g. PUCCH-1 on T2 over SUL), using a configured grant opportunity at T1 over SUL may not give the UE 101 enough time to switch back to UL, hence the expected transmission of PUCCH-1 can be interrupted. In one case example, the information carried over PUCCH-1 is not critical, so its interruption is acceptable and allowed by the priority rule for the consistency test. In another case example, the information carried over PUCCH-1 is critical, and its interruption is not allowed by the priority rule for the consistent test. Regardless, the UE 101 starts transmission on SUL before the CG transmission, and at CG transmission being under the consistency test the UE 101 is still operating on the SUL, as well as after the CG transmission, in which the UE 101 can provide for another PUCCH transmission.

Figure 10:
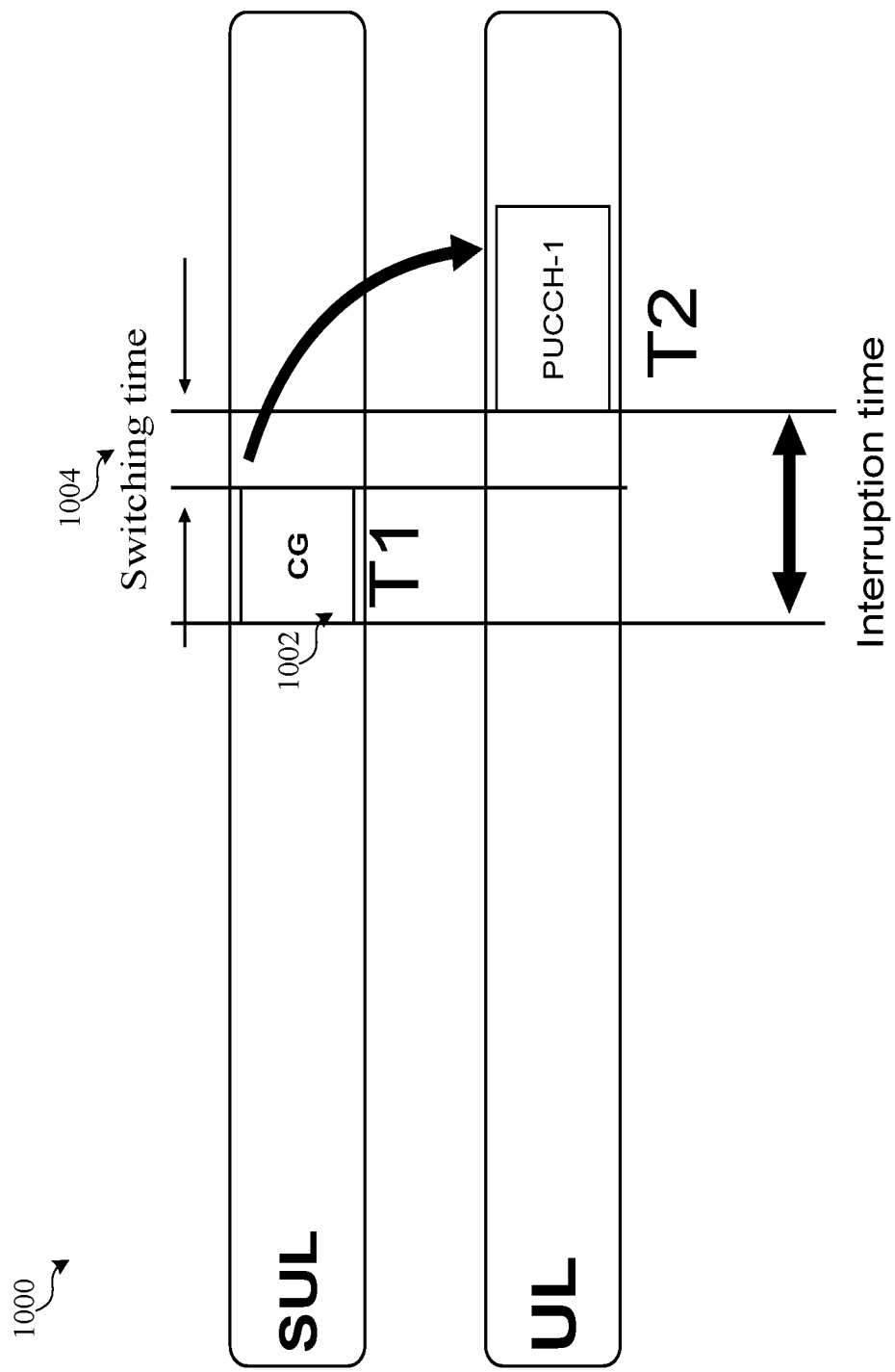
FIG. 10 is another example of interruption time that can be factored into the consistency test for CG transmissions in accordance with various aspects described.

FIG. 10 illustrates another example of interruption time 1000 to be considered as a factor in the consistency test for CG transmissions in accord with embodiments herein. Again, the UE 101 selects or chooses at least one of SUL or UL for configured grant uplink (e.g., PUSCH) or other shared link (e.g., PDSCH) transmission. If the transmission before the tested CG transmission, the tested CG transmission 1002 itself are on the same carrier, but the transmission after the tested CG transmission (e.g., PUCCH-1) are on a different carrier, then the interruption time={the CG transmission time}+{a switching time 1004}.

In another case, if the transmission before the tested CG transmission is on a carrier, but the tested CG transmission itself and the transmission after the tested CG transmission are on a different carrier, the interruption time={a switching time}+{the CG transmission time}. Here, switching time 1004 would just come before the CG transmission time 1002 and could be the same or a different amount of time, for example. The interruption time in this case consists of a switching time 1004 and a CG transmission time 1002 itself.

Figure 11:
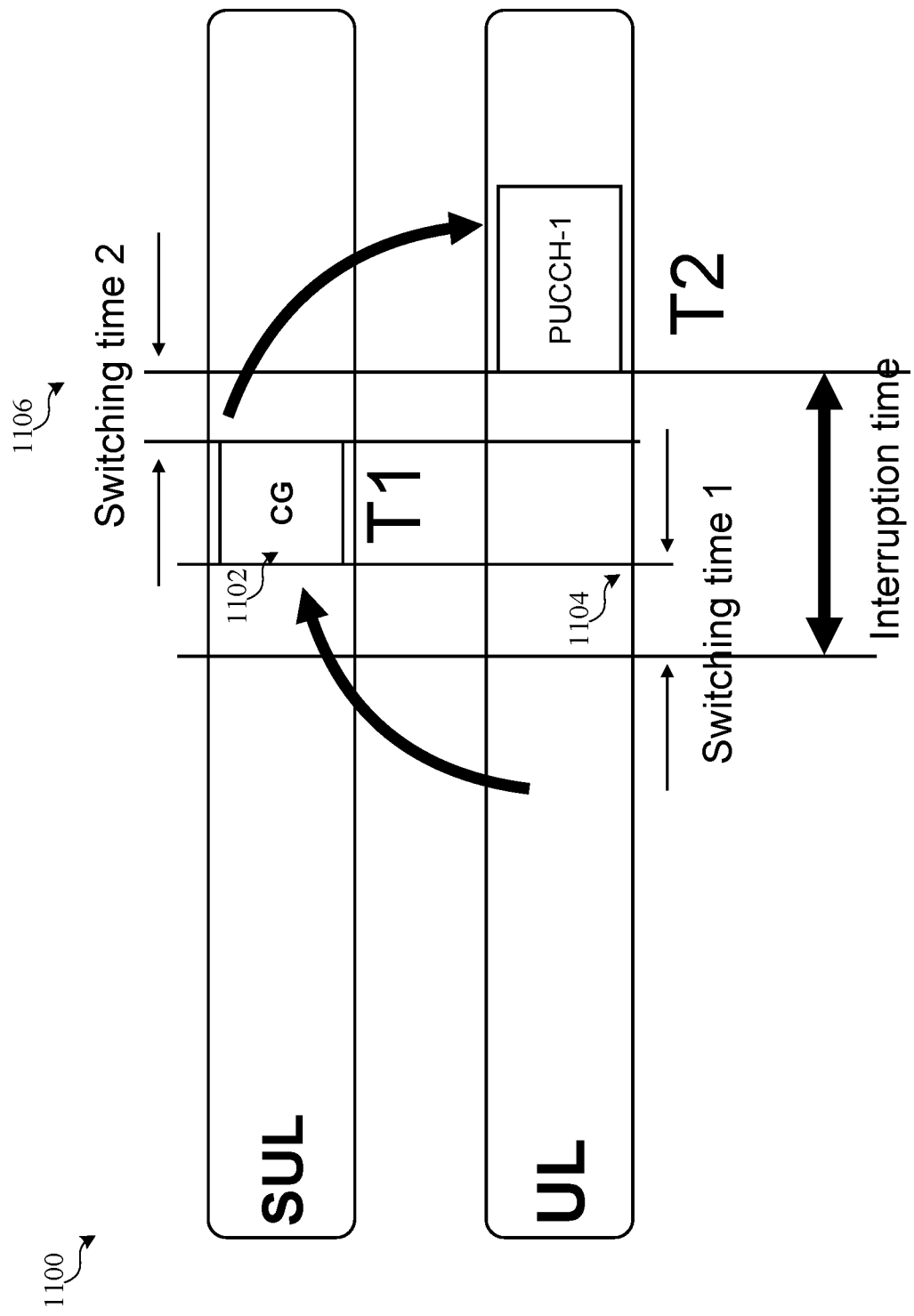
FIG. 11 is another example of interruption time that can be factored into the consistency test for CG transmissions in accordance with various aspects described.

FIG. 11 illustrates another example of interruption time 1100 to be considered as a factor in the consistency test for CG transmissions in accord with embodiments herein. Again, the UE 101 selects or chooses at least one of: SUL or UL for a configured grant PUSCH transmission. If the transmission before the tested CG transmission, and the transmission after the tested CG transmission are on a carrier (e.g., UL), but the CG transmission itself is on another carrier (e.g., SUL), then the interruption time={switching time 1}+{the CG transmission time 1102}+{switching time 2} as shown below.

The UE starts from UL and is to perform CG transmission over SUL and come back for a UL transmission. In this case we have two switching times 1104 and 1106 as T1 and T2 so interruption time duration is longer, along with the CG transmission 1102 time. Now the interruption time consists of switching time 1, CG transmission 1102 itself and switching time 2.

In other aspects/embodiments, for exact time duration for switching time, switching time-1, switching time-2, can be based on the switching time found in TS 38.101-1 for "NR UL from ON to OFF transition time" which is can be in TS38.101-1 section 6.3.3.2: as 10 us; and the "switching time from LTE UL to NR UL" is in TS38.101-1, section 6.36.1.1: 30 us, for example.

Figure 12:
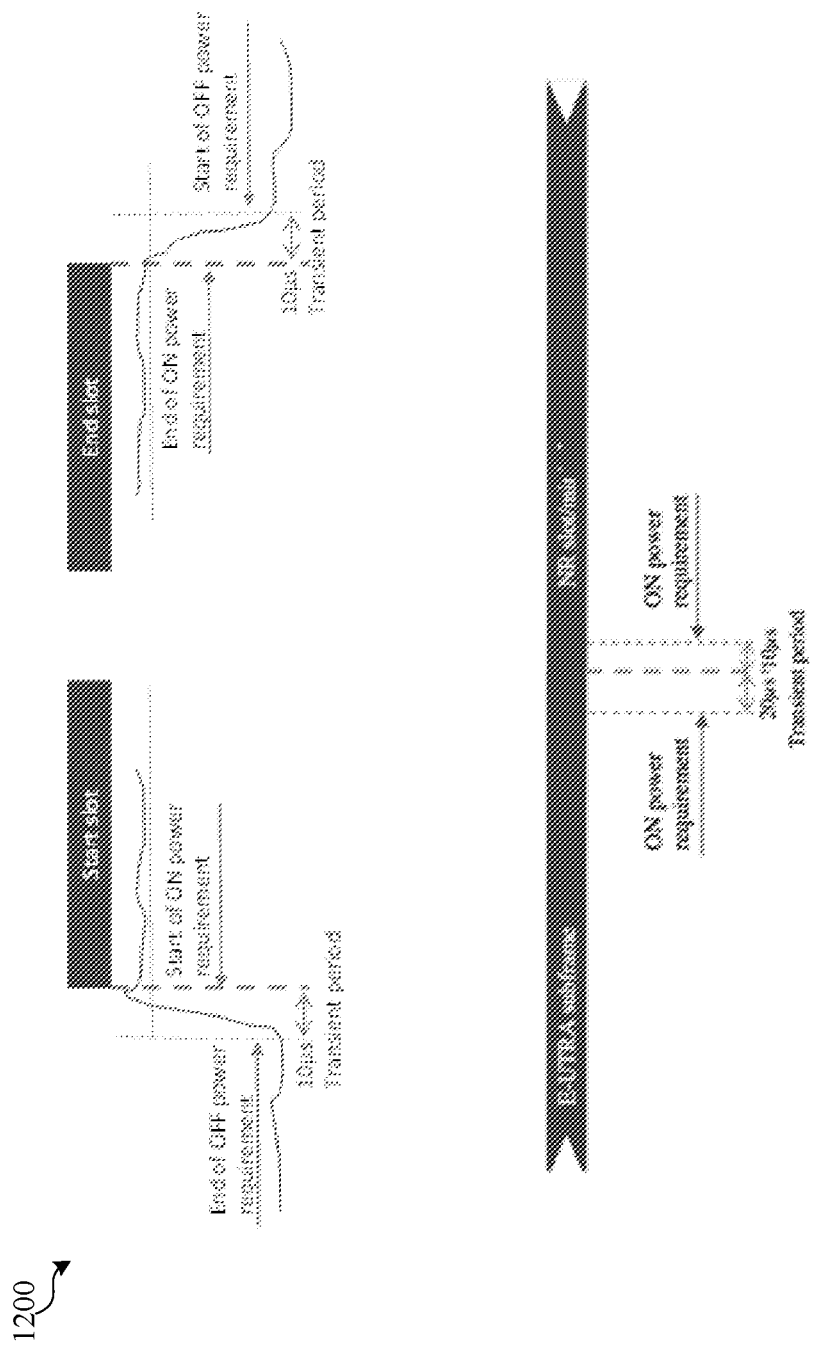
FIG. 12 is an example of power ramp up/down time that can be factored into the consistency test for CG transmissions in accordance with various aspects described.

FIG. 12 illustrates an example of a power off ramp up and ramp down time 1200 that could be around ten microseconds in accord with various aspects. The general ON/OFF time mask defines the observation period between transmit OFF and ON power and between transmit ON and OFF power for each SCS. ON/OFF scenarios include: contiguous and non-contiguous transmission, etc. The OFF power measurement period is defined in a duration of at least one slot excluding any transient periods. The ON power is defined as the mean power over one slot excluding any transient period.

The top figure comprises an NR UL from ON transition time is in TS 38.101-1 section 6.3.3.2: 10 us. The bottom figure demonstrates a switch from LTE UL to NR UL is in TS38.101-1, section 6.36.1.1: 30 us.

In one embodiment, if higher priority channel(s) are to be interrupted by the selected SUL or UL CG transmission, then the UE 101 is not expected to make such a selection of the SUL or UL CG transmission. Alternatively, or additionally, in case of at least a partial time overlap between the configured grant and PUCCH/dynamic grant PUSCH/SRS/PRACH the UE 101 can be configured to shrink the configured grant accordingly, in which the duration of configured grant is reduced. This can be done based on a list of time duration resource allocation (TDRA) parameters that are configured for the configured grant. The shrunken CG can thus result in a change of a TDRA parameter. The TDRA can be either signaled in the configured grant (e.g. with CG-UCI) or by blind detection at gNB 111.

In another embodiment, whether configured grant or PUCCH/dynamic grant PUSCH/SRS/PRACH is shrunk can be based on priority. In the case that the size of the CG is changed, the gNB 111 can determine the size to be able to decode it properly. For example, the gNB 111 can estimate the size blindly. Alternatively, or additionally, the gNB 111 configures the UE 101 with a fixed subset of CG sizes. Alternatively, or additionally, the UE 101 sends the CG with a size selected from one of the pre-configured sizes. Alternatively, or additionally, the gNB blindly decodes the CG using the multiple sizes.

In another embodiment, the UE 101 can be configured to send accompanying uplink control information (UCI) that indicates the size of the transmitted packet according to the CG size that has been modified. It thus indicates in a UCI the modified size of the CG in order to not interfere with the other channels and signals and inform the gNB 111 accordingly of the change.

Figure 13:
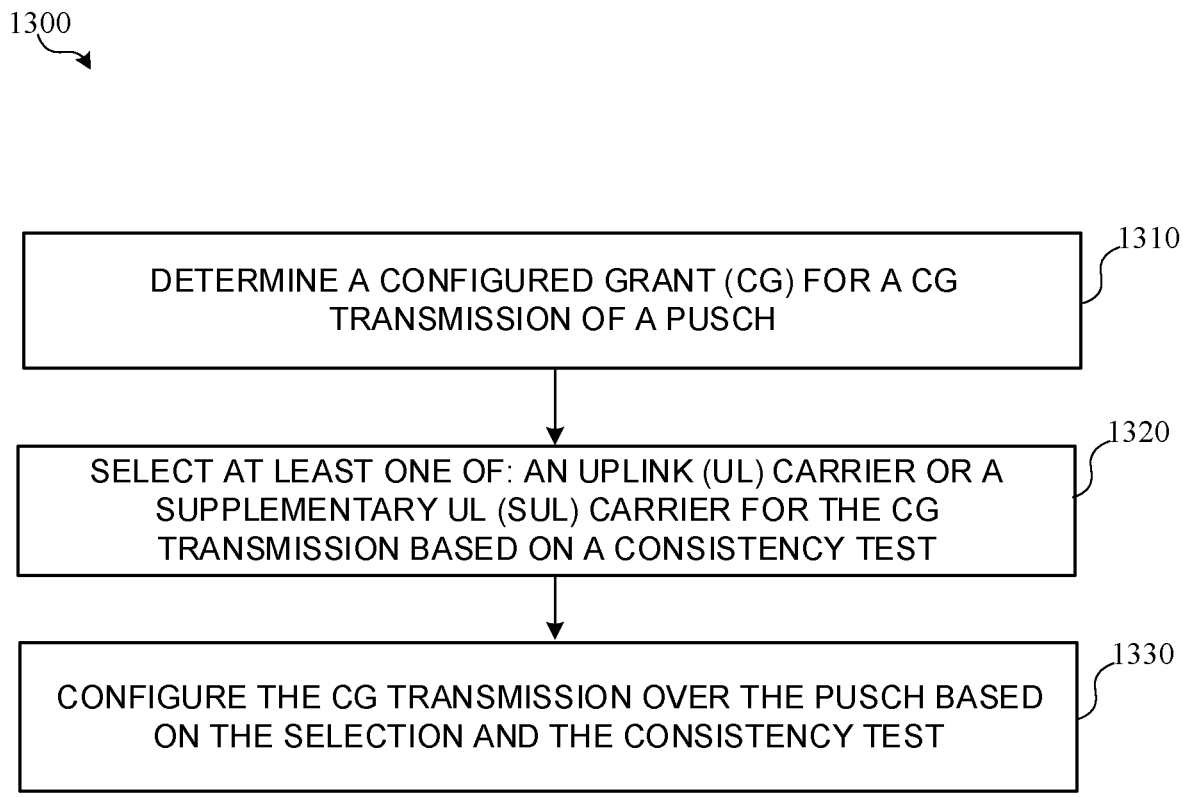
FIG. 13 is an example process flow employable at a network device for communications according to various aspects described herein, according to various aspects discussed herein.

Referring to FIG. 13, illustrated is an example process flow for configuring a CG transmission by selecting at least one of an UL or SUL based on a consistency test. The process flow 1300 initiates at 1302 with determining a configured grant (CG) for a CG transmission of a physical uplink shared channel (PUSCH). At 1304, the process flow further comprises selecting at least one of: an uplink (UL) carrier or a supplementary UL (SUL) carrier for the CG transmission based on a consistency test. At 1306, the process flow 1300 further comprises configuring the CG transmission over the PUSCH based on the selection and the consistency test.

The consistency test can be performed, for example, between the CG transmission and information of one or more other channels or signals that is detected up to a number of L2 symbols before a start of an interruption time for the CG transmission. The consistency test can be based on an interruption time for the CG transmission, wherein the interruption time comprises a CG transmission time, and a single switching time between the UL and SUL or two switching times between the UL and the SUL based on a selection of the CG or the at least one of: the UL or the SUL for the CG transmission.

In embodiment, the consistency test can be performed based on a logical channel indicating whether the UE is configured to select the at least one of: the SUL or the UL, and a set of priorities received from a next generation NodeB (gNB), a higher layer signaling, or a predefined specification that indicates a higher priority or a lower priority corresponding to other channels or signals with respect to the CG transmission.

In another embodiment, a duration of the CG transmission can be modified based on at least a partial overlap with another channel or signal by modifying a time duration resource allocation (TDRA) parameter and a priority of the another channel or signal. The modified duration can be signaled to the gNB based on the TDRA as modified via an uplink control information (UCI).

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus configured to be employed in a User Equipment (UE) for a new radio (NR) communication comprising: one or more processors configured to: process a configured grant (CG) of a physical uplink shared channel (PUSCH); generate a selection of at least one of: an uplink (UL) carrier or a supplementary UL (SUL) carrier based on a consistency test that indicates whether to configure a CG transmission according to a set of CG rules; and configure a CG transmission over the PUSCH based on the selection and the consistency test; a radio frequency (RF) interface, configured to provide, to RF circuitry, data for transmitting the CG transmission as the NR communication.

A second example can include the first example, wherein the one or more processors are further configured to: perform the consistency test between the CG transmission and information of one or more other channels/signals detected up to one or more symbols before the CG transmission or a start of an interruption time.

A third example can include the first or second example, wherein the one or more symbols comprises a number of L2 symbols, and the consistency test is based on a priority level associated with the information of the one or more other channels/signals.

A fourth example can include any one or more of the first through third examples, wherein the consistency test is further based on an interruption time comprising a time from a number of L2 symbols before the CG transmission to an actual PUSCH transmission.

A fifth example can include any one or more of the first through fourth examples, wherein the interruption time further comprises a time of the CG transmission.

A sixth example can include any one or more of the first through fifth examples, wherein the interruption time further comprises a number of switching times that are based on whether the UL carrier or the SUL carrier was utilized prior to the CG transmission, the UL carrier or the SUL carrier selected for the CG transmission, and the UL carrier or the SUL carrier for the actual PUSCH transmission after the CG transmission.

A seventh example can include any one or more of the first through sixth examples, wherein the set of CG rules comprises priority levels associated with other signals/channels to avoid overlapping or disrupting an expected next generation NodeB (gNB) transmission associated with a priority level.

An eighth example can include any one or more of the first through seventh examples, wherein the one or more processors are further configured to: interrupt another channel/signal transmission based on a lower priority level of the another channel/signal transmission.

A ninth example can include any one or more of the first through eighth examples, wherein the one or more processors are further configured to: reduce a duration of the CG transmission based on a time duration parameter in response to at least a partial overlap of physical uplink control channel (PUCCH)/dynamic grant PUSCH, a sounding reference signal (SRS), or a physical random access channel (PRACH), or a priority of another channel/signal being higher than the CG transmission.

A tenth example can include any one or more of the first through ninth examples, wherein the one or more processors are further configured to: communicate the duration of the CG transmission in response to being reduced via an uplink control information (UCI).

An eleventh example is a tangible computer readable storage device storing executable instructions that, in response to execution, cause one or more processors of User Equipment (UE) to perform operations, the operations comprising: determining a configured grant (CG) for a CG transmission of a physical uplink shared channel (PUSCH); selecting at least one of: an uplink (UL) carrier or a supplementary UL (SUL) carrier for the CG transmission based on a consistency test; and configuring the CG transmission over the PUSCH based on the selection and the consistency test.

A twelfth example includes the eleventh example, wherein the operations further comprise: performing the consistency test between the CG transmission and information of one or more other channels or signals that is detected up to a number of L2 symbols before a start of an interruption time for the CG transmission.

A thirteenth example can include the eleventh example or the twelfth example, wherein the operations further comprise: performing the consistency test based on an interruption time for the CG transmission, wherein the interruption time comprises a CG transmission time, and a single switching time between the UL and SUL or two switching times between the UL and the SUL based on a selection of the CG or the at least one of: the UL or the SUL for the CG transmission.

A fourteenth example can include any one or more of the eleventh through the thirteenth examples, wherein the operations further comprise: performing the consistency test based on a logical channel indicating whether the UE is configured to select the at least one of: the SUL or the UL, and a set of priorities received from a next generation NodeB (gNB), a higher layer signaling, or a predefined specification that indicates a higher priority or a lower priority corresponding to other channels or signals with respect to the CG transmission.

A fifteenth example can include any one or more of the eleventh through the fourteenth examples, wherein the operations further comprise: performing the consistency test for a successful outcome or not; selecting the CG transmission from a candidate CG transmission set in response to a successful outcome of the consistency test.

A sixteenth example can include any one or more of the eleventh through the fifteenth examples, wherein the operations further comprise: reducing a duration of the CG transmission based on at least a partial overlap with another channel or signal by modifying a time duration resource allocation (TDRA) parameter and a priority of the another channel or signal; and signaling the duration based on the TDRA as modified via an uplink control information (UCI).

A seventeenth example is a tangible computer readable storage device storing executable instructions that, in response to execution, cause one or more processors of a next generation NodeB (gNB) or other network device to perform operations, the operations comprising: generating a configured grant (CG) via a logical channel; and enabling a selection of at least one of: an uplink (UL) or a supplementary UL (SUL) to be utilized for a CG transmission on an uplink channel based on the CG and a consistency test for determining interfering or colliding transmission with the CG transmission.

An eighteenth example includes the seventeenth example, wherein the operations further comprise: providing an indication of one or more priority levels corresponding to one or more other channels or signals to be considered as at least a part of the consistency test.

A nineteenth example includes any one or more of the seventeenth through eighteenth examples, wherein the consistency test comprises an interruption time for providing the CG transmission and at least one switching time between the UL and the SUL.

A twentieth example includes any one or more of the seventeenth through nineteenth examples, wherein the operations further comprise: blind-decoding a change of a time duration parameter for the CG transmission; or determining the change via an uplink control information (UCI) via the uplink channel.

Examples can include one or more non-transitory computer-readable media comprising instructions to cause an electronic device, upon execution of the instructions by one or more processors of the electronic device, to perform one or more elements of a method described in or related to any of examples above, or any other method or process described herein.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. A User Equipment (UE) comprising:
   radio frequency (RF) circuitry; and
   one or more processors configured to execute instructions stored in a memory to cause the UE to:
   receive a configuration of a configured grant (CG) for a physical uplink shared channel (PUSCH);
   perform a consistency test to determine whether to configure a CG transmission by applying a set of CG rules for determining a priority of an interfering or a colliding transmission with the CG transmission;
   generate a selection of at least one of: an uplink (UL) carrier or a supplementary UL (SUL) carrier based on the consistency test; and
   transmit, via the RF circuitry, the CG transmission over the PUSCH based on the selection and the consistency test.

2. The UE of claim 1, wherein the one or more processors are further configured to:
   perform the consistency test based on the CG transmission and one or more other channels/signals detected up to one or more symbols before the CG transmission or a start of an interruption time for the CG transmission.

3. The UE of claim 2, wherein the one or more symbols comprises a number of L2 symbols, and the consistency test is based on a priority level associated with the one or more other channels/signals.

4. The UE of claim 2, wherein the interruption time for the CG transmission is based on a time to switch between the UL carrier and the SUL carrier.

5. The UE of claim 4, wherein the interruption time for the CG transmission is further based on a time of the CG transmission.

6. The UE of claim 4, wherein the interruption time is further based on whether the UL carrier or the SUL carrier was utilized prior to the CG transmission, and whether the UL carrier or the SUL carrier is selected for the CG transmission.

7. The UE of claim 1, wherein the set of CG rules comprises priority levels associated with the CG transmission and other signals/channels.

8. The UE of claim 7, wherein the one or more processors are further configured to:
   configure the CG transmission and interrupt another channel/signal transmission based on a lower priority level of the another channel/signal transmission relative to the CG transmission.

9. The UE of claim 1, wherein the one or more processors are further configured to:
   reduce a duration of the CG transmission based on a time duration parameter in response to the CG transmission at least a partially temporally overlapping another channel/signal with a higher priority than the CG transmission.

10. The UE of claim 9, wherein the one or more processors are further configured to:
communicate the reduced duration of the CG transmission via uplink control information (UCI).

11. A baseband processor configured to, when executing instructions stored in a memory, perform operations comprising:
processing a configuration of a configured grant (CG) for a CG transmission over a physical uplink shared channel (PUSCH);
performing a consistency test to determine a priority of an interfering or a colliding transmission with the CD transmission;
selecting at least one of: an uplink (UL) carrier or a supplementary UL (SUL) carrier for the CG transmission based on the consistency test; and
providing, to a radio frequency (RF) interface, the CG transmission for transmission by RF circuitry over the PUSCH based on the selection and the consistency test.

12. The baseband processor of claim 11, wherein the operations further comprise:
performing the consistency test based on the CG transmission and one or more other channels or signals that is detected up to a number of L2 symbols before a start of an interruption time for the CG transmission.

13. The baseband processor of claim 12,
wherein the interruption time is based on a CG transmission time, and a switching time between the UL carrier and the SUL carrier.

14. The baseband processor of claim 11, wherein the selection is further based on an information element (IE) that indicates whether the UL carrier or the SUL carrier are allowed for a logical channel associated with the CG transmission.

15. The baseband processor of claim 11, wherein the operations further comprise:
determining a candidate CG transmission set based on the consistency test; and
selecting the CG for the CG transmission from the candidate CG transmission set.

16. The baseband processor of claim 11, wherein the operations further comprise:
reducing a duration of the CG transmission in response to the CG transmission at least a partially temporally overlapping with another channel or signal with a higher priority than the CG transmission.

17. A baseband processor configured to, when executing instructions stored in a memory, perform operations, the operations comprising:
generating a configuration of a configured grant (CG) via a logical channel; and
enabling a selection of at least one of: an uplink (UL) or a supplementary UL (SUL) to be utilized for a CG transmission on an uplink channel based on the CG configuration and a consistency test for determining an interfering or colliding transmission with the CG transmission.

18. The baseband processor of claim 17, wherein the operations further comprise:
providing an indication of one or more priority levels corresponding to one or more other channels or signals, wherein the consistency test is based on the one or more priority levels.

19. The baseband processor of claim 17, wherein the consistency test is based on an interruption time for providing the CG transmission and at least one switching time between the UL and the SUL.

20. The baseband processor of claim 17, wherein the operations further comprise:
blind-decoding a change of a time duration parameter for the CG transmission; or
determining the change of the time duration parameter based on uplink control information (UCI) received via the uplink channel.

* * * * *